(12) United States Patent
Hodgson et al.

(10) Patent No.: US 11,511,394 B2
(45) Date of Patent: Nov. 29, 2022

(54) MITRE JOINT SUPPORT

(71) Applicant: Tomm Tech Pty Ltd, Bunbury (AU)

(72) Inventors: Thomas Hodgson, Bunbury (AU); Riley Hodgson, Bunbury (AU)

(73) Assignee: Tomm Tech Pty Ltd, Bunbury (AU)

( * ) Notice: Subject to any disclaimer, the term of this patent is extended or adjusted under 35 U.S.C. 154(b) by 128 days.

(21) Appl. No.: 17/052,169

(22) PCT Filed: May 7, 2019

(86) PCT No.: PCT/AU2019/050418
§ 371 (c)(1),
(2) Date: Oct. 30, 2020

(87) PCT Pub. No.: WO2019/213699
PCT Pub. Date: Nov. 14, 2019

(65) Prior Publication Data
US 2021/0046615 A1 Feb. 18, 2021

(30) Foreign Application Priority Data
May 7, 2018 (AU) ................................ 2018901554

(51) Int. Cl.
*B25B 5/00* (2006.01)
*B25B 5/06* (2006.01)
(Continued)

(52) U.S. Cl.
CPC .............. *B25B 5/068* (2013.01); *B25B 5/147* (2013.01); *F16B 7/0473* (2013.01)

(58) Field of Classification Search
CPC ........... B25B 5/00; B25B 5/003; B25B 5/067; B25B 5/101; B25B 5/125; B25B 5/068;
(Continued)

(56) References Cited

U.S. PATENT DOCUMENTS 5,010,708 A * 4/1991 Evans ................... F16B 7/0446
403/402
D909,855 S * 2/2021 Kellum .......................... D8/382
(Continued)

FOREIGN PATENT DOCUMENTS

CN    103046844 A    4/2013
DE      932876 C    9/1955
(Continued)

OTHER PUBLICATIONS

International Search Report for PCT Application No. PCT/AU2019/050418 dated Aug. 16, 2019.
(Continued)

*Primary Examiner* — Lee D Wilson
(74) *Attorney, Agent, or Firm* — Socal IP Law Group LLP; Michael D. Harris (57) ABSTRACT

A support for a mitre joint uses two wedging mechanisms disposed at a characteristic angle. Each wedging mechanism is arranged to locate inside a hollow rail, such as within an extruded hollow beam. The wedging mechanism can be operated from outside the joint in order to clamp the mechanism in position. The mechanism has a self centering capability to assist in accurately locating the rails relative to each other.

20 Claims, 6 Drawing Sheets

(51) Int. Cl.
B25B 5/14 (2006.01)
F16B 7/04 (2006.01)

(58) Field of Classification Search
CPC .......... B25B 5/147; F16B 7/0473; F16B 7/00; F16B 9/00
See application file for complete search history.

(56) References Cited

U.S. PATENT DOCUMENTS

| | | | |
|---|---|---|---|
| 11,078,720 B2* | 8/2021 | Kellum | E06B 3/9644 |
| 2009/0241610 A1 | 10/2009 | Watts et al. | |
| 2014/0064844 A1* | 3/2014 | Massey | E06B 3/9684 |
| | | | 403/402 |
| 2020/0032578 A1* | 1/2020 | Parry | E06B 3/9688 |
| 2021/0046615 A1* | 2/2021 | Hodgson | E06B 3/9725 |

FOREIGN PATENT DOCUMENTS

| | | |
|---|---|---|
| GB | 905094 A | 9/1962 |
| GR | 1006024 B | 10/2008 |
| RU | 1819318 | 5/1993 |
| RU | 1819318 A3 | 5/1993 |
| WO | 2017205940 A1 | 12/2017 |
| WO | 2018201203 A1 | 11/2018 |
| WO | 2019213699 A1 | 11/2019 |

OTHER PUBLICATIONS

European Patent Office, European Search Report for EP 19799384.3, dated Dec. 17, 2021, 9 total pages.
State Intellectual Property Office of People's Republic of China, First Office Action for 201980031087.X, dated Dec. 29, 2021, 9 total pages.

* cited by examiner

MITRE JOINT SUPPORT

International patent application numbers PCT/AU2017/050544 and PCT/AU2018/050415, the contents of which are incorporated herein by reference, describe panel systems used primarily for the formation of fences and gates. These systems feature a rectangular frame made of hollow aluminium rails with slats extending between the rails internally of the frame.

This application claims priority to International PCT Application No. PCT/AU2019/050418, filed May 7, 2019, entitled "MITRE JOINT SUPPORT" which claims priority to Australian Patent Application No.: 2018901554 filed May 7, 2018, the disclosures and figures of which are incorporated by reference as if set forth herein in their entirety.

BACKGROUND

Field of the Invention

The present invention relates to the connection of two hollow section beams at an angle to form a mitre joint. The invention has been created in the context of metal fencing panels and gates, but is considered to have wider application, including in the context of metal framed doors and windows.

Background to the Invention

The use of aluminium (or other metal) rails to form a rectangular frame is common in the building industry. Such frames may support windows, glass doors, fencing panels, security screens, insect screens and many similar applications.

Some common problems exist in the creation of rectangular frames. One problem is the requirement that the rails are connected at precisely 90°. Errors in cutting, in drilling, or in alignment can result in a frame which is not 'square'. In some cases this is merely unsightly. In other cases, the result may be a final product which does not operate correctly, or fit into a required space.

A second problem is that the mitre joint between rails frequently represents a weak point of the frame. This is exacerbated by the fact that the weak point is at an outer edge of the frame, where the most leverage can be applied. Where the frame is subject to significant load, or where the frame is used for security purposes, this can represent a difficult problem to address.

Thirdly, a common form of connection of mitre joints between hollow rails requires forcing an internally, preformed 90° bend into the hollow section using an interference fit. Where there is any misalignment in the rails this method can lead to damage to the rails; looseness of the connection; and/or difficulty in removal of the bend.

Often, is it necessary to weld rails together to obtain sufficient joint strength. Welding can create further problems, such as distortion due to heat and damage to surface coatings. If a welded joint requires grinding to ensure smoothness, the strength of the join may be compromised.

The present invention proposes a method of construction of a mitre joint between generally hollow members which at least partially addresses some of these concerns. While the invention is described for use in the creation of rectangular frames, it will be appreciated that its uses extend into connection of hollow frame members generally, with angles of connection which may not be at 90°. As such, the present invention may be used in other situations such as in the construction of hollow framed furniture, or indeed virtually any application when tubular shapes formed from a rigid material are to be connected.

SUMMARY OF THE INVENTION

According to one aspect of the present invention there is provided a support for a mitre joint, the support having a central region, the support having a first arm extending away from the central region in a first direction and a second arm extending away from the central region in a second direction, the second direction being angled with respect to the first direction by a characteristic angle;

each of the first arm and the second arm having:

(a) a fixed portion oriented generally in the respective first or second direction; the fixed portion having an outer surface, and having an inner surface opposed to the outer surface and inclined relative to the respective first or second direction at an inclination angle;

(b) a moveable portion arranged to move generally in the respective first or second direction, the moveable portion having an outer surface opposed to an inner surface, the inner surface being inclined relative to the outer surface at the inclination angle; and (c) an adjustment mechanism arranged to move the moveable portion;

wherein the inner surface of the moveable portion is arranged to abut the inner surface of the fixed portion, with the outer surface of the moveable portion being generally aligned in the respective first or second direction.

The characteristic angle may be 90°. Alternatively, the characteristic may be an acute angle or an obtuse angle.

Preferably the outer surface of each fixed portion is oriented in the respective first or second direction;

Preferably each moveable portion is generally prismatic.

In a preferred embodiment, the adjustment mechanism is a linear actuator, such as a lead screw.

It is preferred that the lead screw has a head located within the central region of the support.

In a preferred embodiment, the lead screw of the first arm is laterally offset in a transverse direction relative to the lead screw of the second arm.

The outer surface of each fixed arm may be ridged. In a preferred embodiment, the outer surface of each fixed arm has ridges oriented perpendicular to the respective first or second direction.

The outer surface of each moveable arm may be ridged. In a preferred embodiment, the outer surface of each moveable arm has ridges oriented perpendicular to the respective first or second direction.

Each fixed arm preferably has a narrow end remote from the central region. The narrow end may include a rounded or bevelled edge portion.

Each moveable arm preferably has a narrow end oriented towards the central region, and a wide end oriented away from the central region. The wide end may include a rounded or bevelled edge portion.

Each moveable arm preferably includes an internally threaded aperture extending in the respective direction inwardly from the narrow end in the respective first or second direction. The internally threaded aperture is arranged to receive the adjustment mechanism.

Each of the first and second arms may include two moveable portions. In this embodiment the outer surface of the fixed portion may be inclined relative to the respective first or second direction at a second inclination angle, and a second moveable portion may have an inner surface arranged to abut the outer surface of the fixed portion, the inner surface of the second moveable portion being inclined relative to an outer surface of the second moveable portion at a second inclination angle. Each of the first and second arms may include two adjustment mechanisms, one associated with each moveable portion. Alternatively, the two moveable portions may be coupled together.

The movement of the moveable portion may be readily reversive, allowing for easy release of a supported mitre joint. In an alternative embodiment, the moveable portion may be arranged to move in the respective first or second direction into a locked position whereby the outer surface of the moveable arm partially embeds within a rail within the supported mitre joint.

According to a second aspect of the present invention there is provided a support for a mitre joint, the support having a central region, the support having a first arm extending away from the central region in a first direction and a second arm extending away from the central region in a second direction, the second direction being angled with respect to the first direction by a characteristic angle;

each of the first arm and the second arm having:

(a) a fixed portion oriented generally in the respective first or second direction; the fixed portion having an outer surface, and having an inner surface opposed to the outer surface and inclined relative to the respective first or second direction at an inclination angle;

(b) a moveable portion arranged to move generally in the respective first or second direction, the moveable portion having an engaging surface, the engaging surface being inclined relative to the respective first or second direction at the inclination angle; and (c) an adjustment mechanism arranged to move the moveable portion; wherein the inner surface of the moveable portion is arranged to abut the inner surface of the fixed portion.

DESCRIPTION OF THE DRAWINGS

Brief Description of the Drawings

It will be convenient to further describe the invention with reference to preferred embodiments of the present invention. Other embodiments are possible, and consequently the particularity of the following discussion is not to be understood as superseding the generality of the preceding description of the invention. In the drawings.

DETAILED DESCRIPTION

Detailed Description of Preferred Embodiments

Referring to the FIGS. 1 to 6, there can be seen a mitre join support 10 which is arranged to connect a first hollow rail 12 to a second hollow rail 14 at an angle of 90°.

The hollow rails 12, 14 are each square in cross section. It will be appreciated that although the embodiments shown herein are arranged for these particular rails 12, 14 the relative proportions of the mitre join support 10 can be readily altered to accommodate hollow rails of different proportions.

The mitre join support 10 has a first arm 16 arranged to be inserted within the first hollow rail 12 and a second arm 18 arranged to be inserted within the second hollow rail 14. The first arm 16 and the second arm 18 each extend away from a central region 20.

The first arm 16 extends away from the central region 20 in a first direction 22. The second arm 18 extends away from the central region 20 in a second direction 24. The first direction 22 is perpendicular to the second direction 24, thus creating the 90°0 which is characteristic of the mitre join support 10.

The first arm 16 and the second arm 18 are formed in the same way, and thus the following description of the first arm 16 applies equally to the second arm 18.

The first arm 16 has a fixed portion 30, which extends away from the central region 20 in the first direction 22. The fixed portion 30 is generally prismatic, with a common cross section between a first side 32 and a second side 34. The first side 32 and second side 34 are each generally flush, and are arranged to locate within the first hollow rail 12 loosely abutting side walls of the hollow rail 12. The fixed portion 30 has an outer surface 36 which extends in the first direction 22, and from a lower edge of the first side 32 to a lower edge of the second side 34. The arrangement is such that the outer surface 36 of the fixed portion 30 extends from a first outer surface 38 of the central region 20 to form a continuous outer surface along a lower face of the mitre join support 10. The outer surface 36 of the fixed portion 30 is arranged to locate against a bottom wall of the first hollow rail 12.

The outer surface 36 is ridged, with ridges extending transversely across the outer surface 36 from the first side 32 to the second side 34.

The fixed portion 30 has an inner surface 40 opposed to the outer surface 36. The inner surface 40 extends across a top of the fixed portion 30, from the first side 32 to the second side 34.

The inner surface 40 is inclined relative to the outer surface 36 at an inclination angle. In the embodiment of the drawings, the inclination angle is between 3° and 4°. The arrangement is such that the inner surface 40 tapers towards the outer surface 36 moving away from the central region 20. In this way, the fixed portion 30 has a relatively narrow outer end 42 remote from the central region 20.

The first arm 16 has a moveable portion 50, which is generally complementary to the fixed portion 30. The moveable portion 50 is generally prismatic, with a generally common cross section between a first side 52 and a second side 54. The first side 52 is arranged to be generally co-planar with the first side 32 of the fixed portion 30, and the second side 54 is arranged to be generally co-planar with the second side 34 of the fixed portion 30.

The moveable portion 50 has an outer surface 56, arranged to locate against an upper wall of the first hollow rail 12. The outer surface 56 is ridged, with ridges extending transversely across the outer surface 56 from the first side 52 to the second side 54.

The moveable portion 50 has an inner surface 60 opposed to the outer surface 56. The inner surface 60 extends across a lower face of the moveable portion 50, from the first side 52 to the second side 54.

The inner surface 60 is inclined relative to the outer surface 56 at the same inclination angle as in the fixed portion 30. In contrast to the fixed portion 30, the arrangement for the moveable portion 50 is that the inner surface 60 tapers away from the outer surface 56 moving away from the central region 20. In this way, the fixed portion 50 has a relatively wide outer end 62 remote from the central region 20, and a relatively narrow inner end 64 facing the central region 20.

The arrangement is such that the inner surface 60 of the moveable portion 50 abuts and bears against the inner surface 40 of the fixed portion 30. With the same angle of inclination, but a reversed orientation, this means that the outer surface 56 of the moveable portion 50 is parallel to the outer surface 36 of the fixed portion 30.

It will be apparent that this arrangement provides a wedging effect. Movement of the moveable portion 50 in the first direction 22 acts to either increase or decrease the effective depth of the first arm 16.

Movement of the moveable portion 50 is effected by means of an adjustment mechanism, based around a linear actuator formed by a lead screw 70. The moveable portion 50 has an internally threaded aperture 66 extending inwardly of the inner end 64, in the first direction 22. The lead screw 70 has a head 72 arranged to seat within the central region 20, and a threaded shaft 74 arranged to engage within the aperture 66. As the head 72 is turned, for instance using a tool such as an Allen key, the moveable portion 50 moves along the lead screw 70.

In use, the lead screw 70 is loosened to decrease the effective depth of the first arm 16. The first arm 16 can then be introduced into the first hollow rail 12. It will be noted that the outermost edges of the outer surfaces 36, 56 are rounded at edges 80 to assist entry of the first arm 16 into the first hollow rail 12. Once the first arm 16 has slid inwardly until the first hollow rail 12 abuts the central region 20, the lead screw 70 can be turned to increase the effective depth of the first arm 16.

This continues until the effective depth of the first arm 16 corresponds to the gap between the bottom wall and the upper wall of the first hollow rail 12. When this depth is reached, the outer surface 36 of the fixed portion 30 will bear against the bottom wall, and the outer surface 56 of the moveable portion 50 will bear against the upper wall. The ridged nature of the outer surfaces 36, 56 increases the degree of friction holding them against the inner surfaces of the first hollow rail 12. The parallel positions of the two outer surfaces 36, 56 means that the bearing engagement takes place across the outer surfaces 36, 56, reducing the likelihood of bearing concentrations and having a self-centering function.

The second arm 18 acts in an identical fashion to secure the second rail 14 relative to the central region 20.

It will be understood that if the lead screw 70 associated with the first arm 16 and a lead screw 76 associated with the second arm 18 are located in the same plane then the operation of one may interfere with the operation of the other. For this reason the lead screws 70, 76 are laterally offset; with one positioned towards the first side 32 and the other positioned towards the second side 34.

The self-centering nature of the bearing engagement between the first arm 16 and the first hollow rail 12; and the second arm 18 and the second hollow rail 14; means that the final angular disposition between the rails 12, 14 will match the characteristic angle of the mitre join support 10. The action of tightening the lead screws 70, 76 will both lock the mitre joint and will pull the respective hollow rails 12, 14 towards the central portion 20 to ensure a clean finish.

In the embodiment of FIGS. 1 to 6, it is envisaged that the lead screw 70 can be loosened to allow the first hollow rail 12 to be released from the mitre join support 10. It will be appreciated that in an alternative arrangement, the screw 70 may be arranged to load the first arm 16 such that the outer surfaces 36, 56 actively embed within the internal surfaces of the first hollow rail 16. In such an arrangement, it is envisaged that the screw 70 may be removed entirely once the first arm is loaded so as to created a permanent joint, which may be used in structural applications.

Other embodiments of the present invention are possible. Some examples of these are shown in FIGS. 7 to 11.

The mitre join support 10 of FIGS. 1 to 6 has fixed portions 30 on the outside of the join, and moveable portions 50 on the inside. In the embodiment depicted in FIG. 7, these positions are reversed. The fundamental operation of the mitre join support is unchanged.

Figure 1:
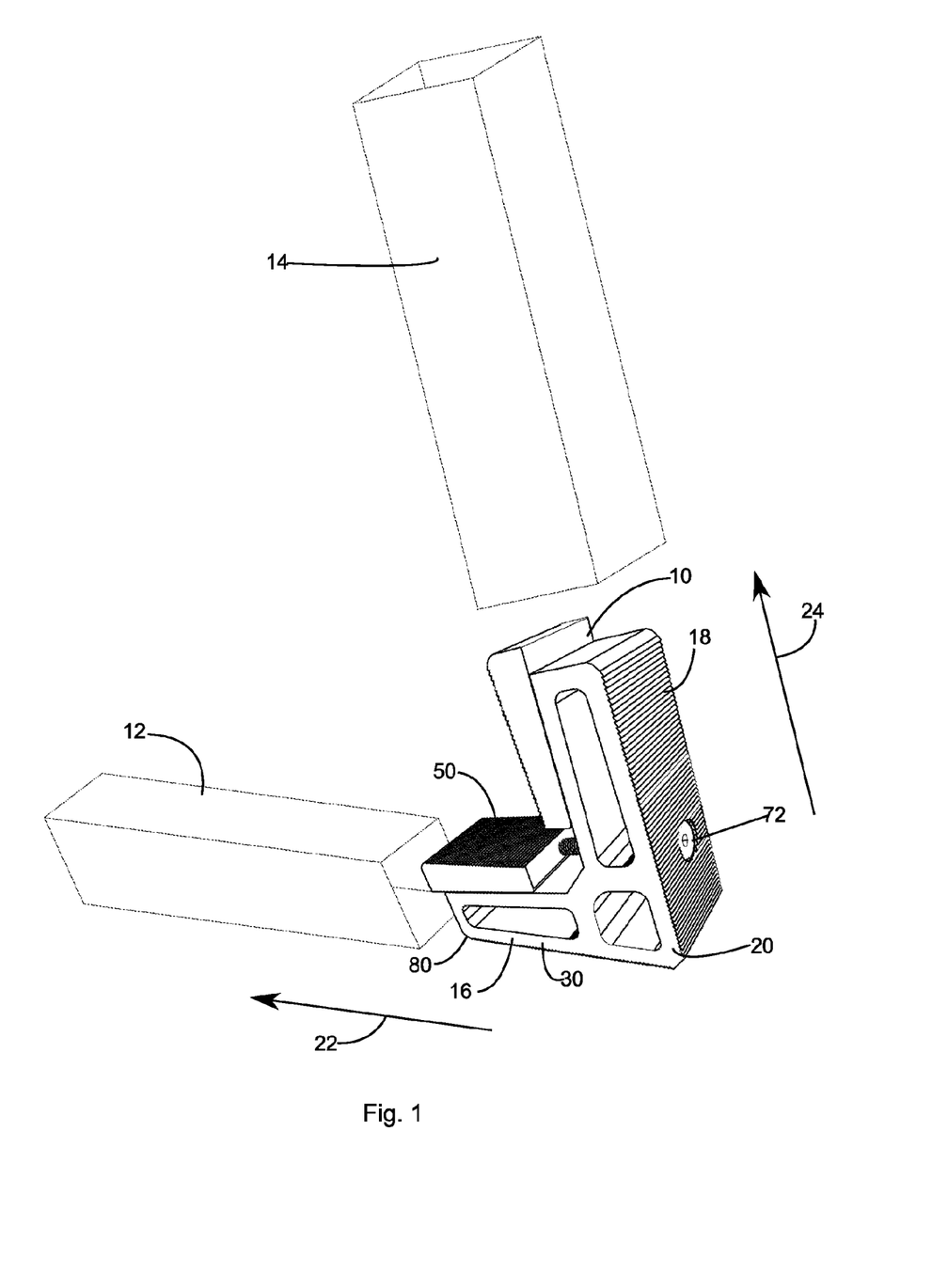
FIG. 1 is a perspective of a mitre join support in accordance with the present invention; shown immediately prior to use.
Figure 2:
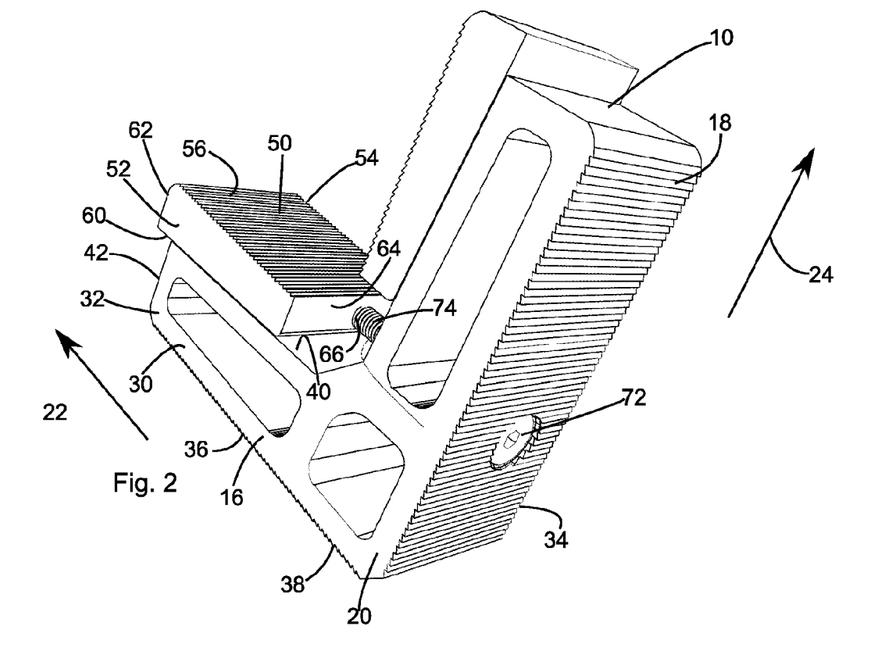
FIG. 2 is a rear perspective of the mitre join support of FIG. 1.
Figure 3:
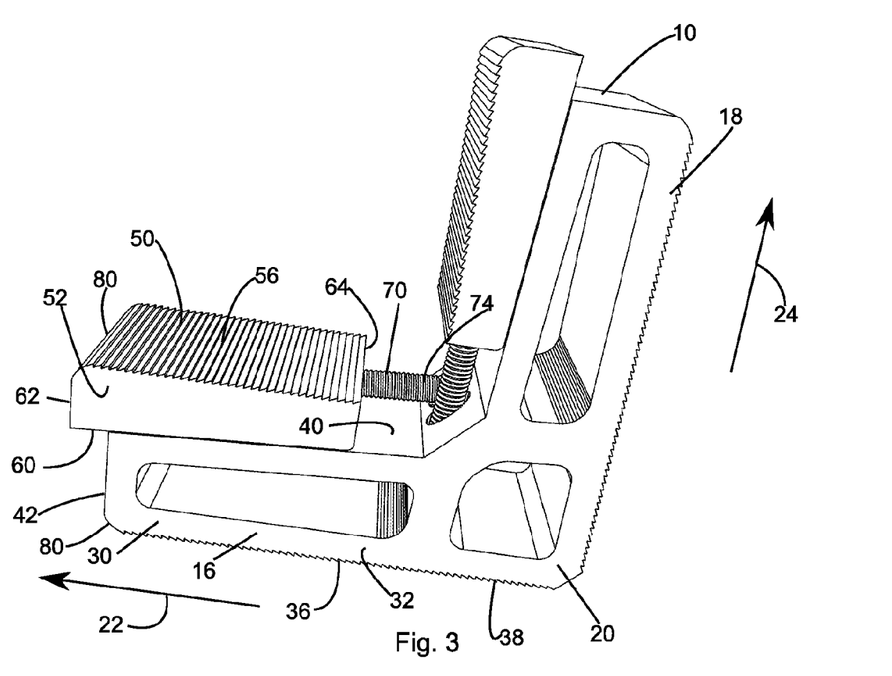
FIG. 3 is a side perspective of the mitre join support of FIG. 1.
Figure 4:
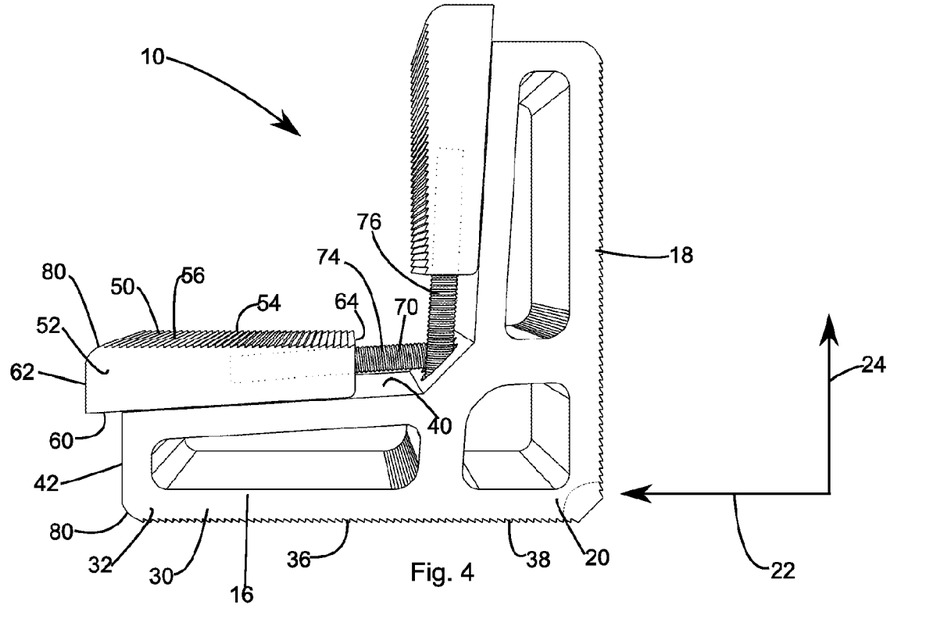
FIG. 4 is a side view of the mitre join support of FIG. 1.
Figure 5:
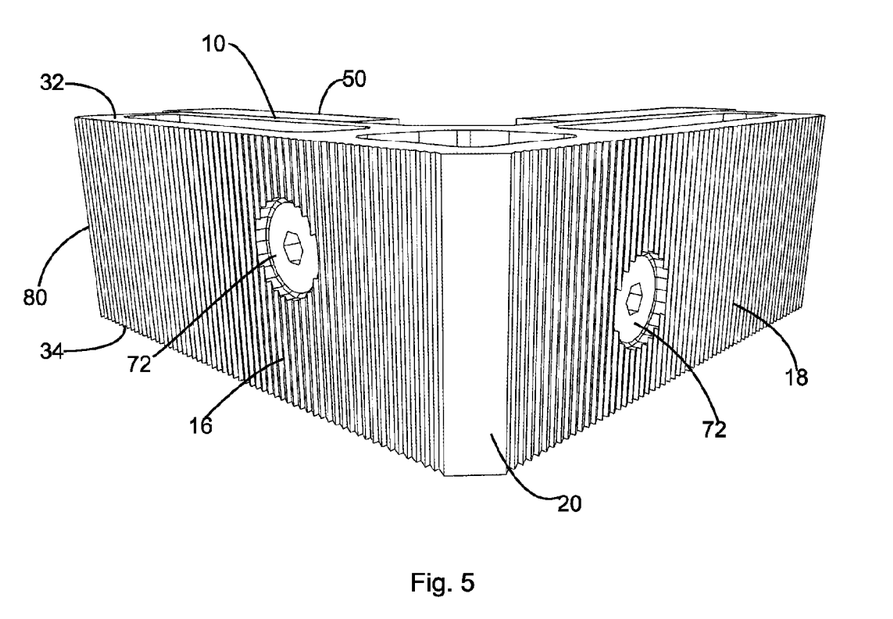
FIG. 5 is a behind perspective of the mitre join support of FIG. 1.
Figure 6:
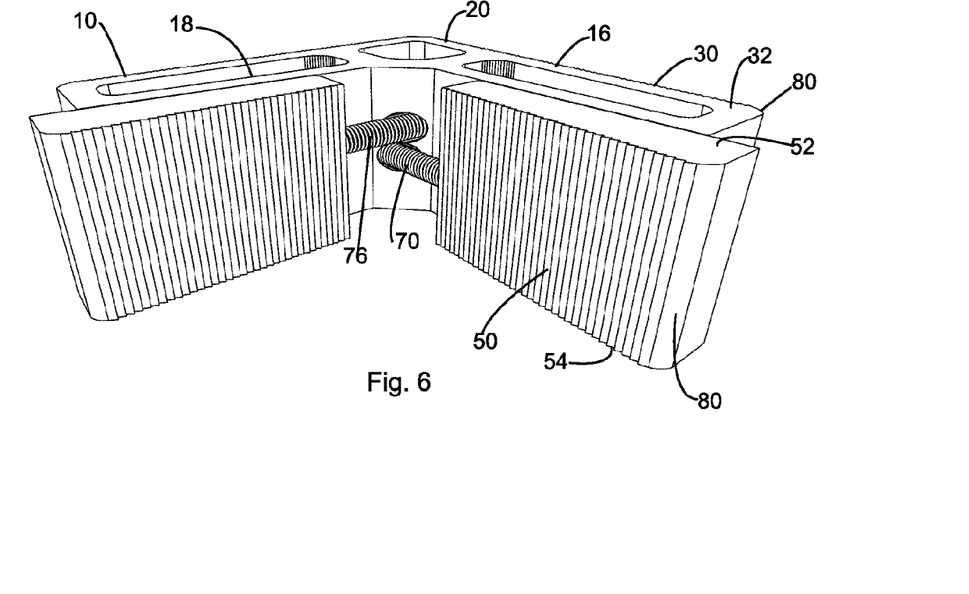
FIG. 6 is a front perspective of the mitre join support of FIG. 1.
Figure 7:
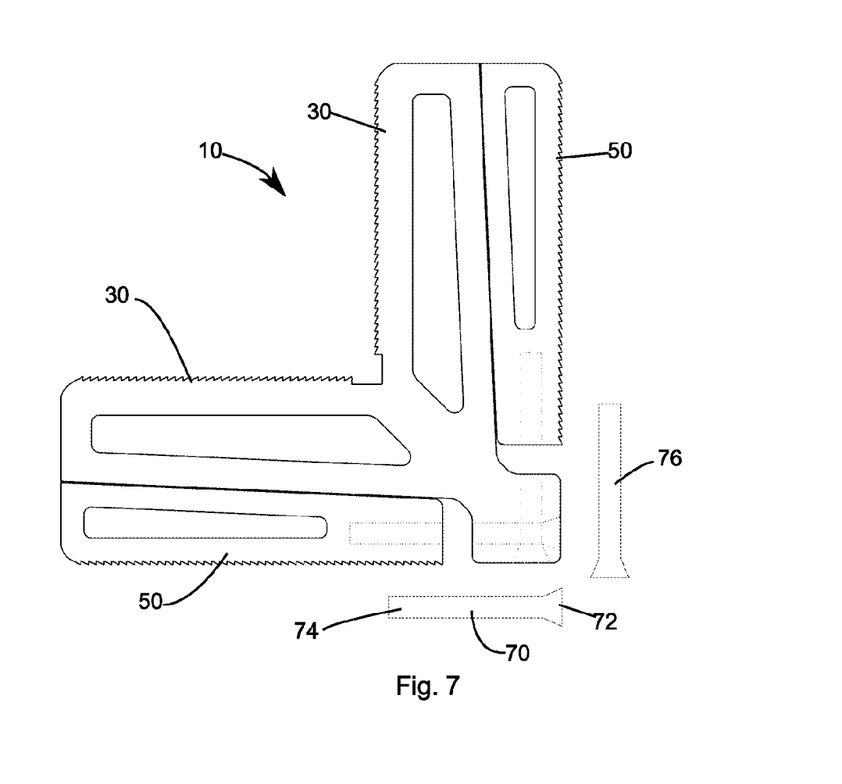
FIG. 7 is a side view of a mitre join support in accordance with a second embodiment of the present invention.
Figure 8:
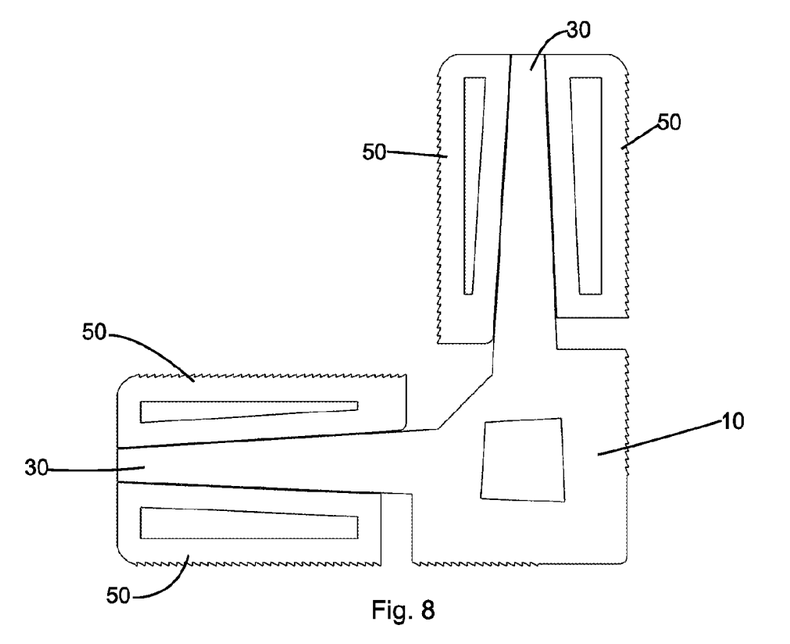
FIG. 8 is a side view of a mitre join support in accordance with a third embodiment of the present invention.
Figure 9:
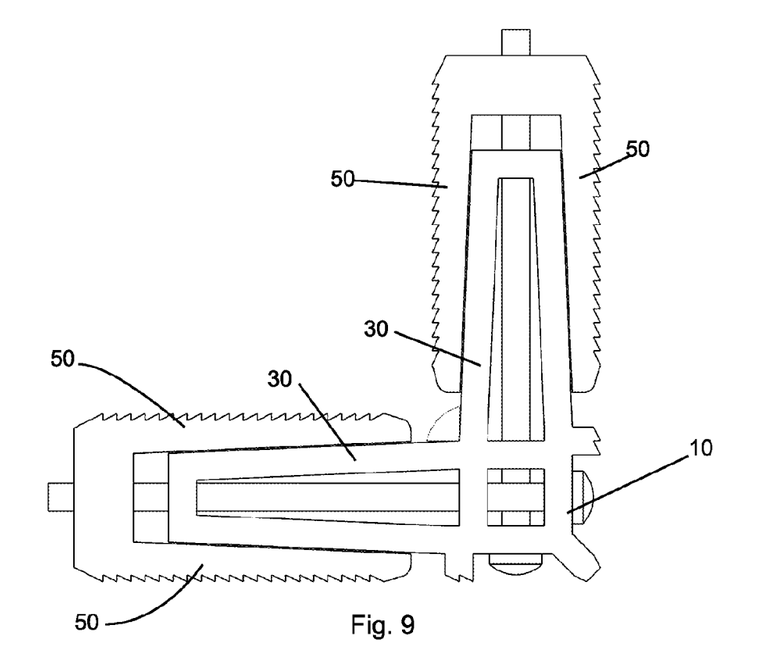
FIG. 9 is a side view of a mitre join support in accordance with a fourth embodiment of the present invention.

FIGS. 8 and 9 show arrangements where each of the first and second arms 16, 18 include two wedging arrangements. In these embodiments the fixed portion 30 is located between two moveable portions 50. Rather than an outer surface 36, the fixed portion 30 of FIGS. 8 and 9 has effectively two inner surfaces 40, each of which is inclined relative to the first direction 22.

The embodiment of FIG. 8 suggests that the two moveable portions 50 can be moved independently, potentially expanding the range of sizes of hollow rail the mitre join support can accommodate.

The embodiment of FIG. 9 has the two moveable portions 50 coupled together, with the lead screw 70 extending through the centre of the fixed portion 30 in order to capture an outer end of the moveable portions 50. This embodiment would appear to be useful in an environment of tight tolerances.

Figure 10:
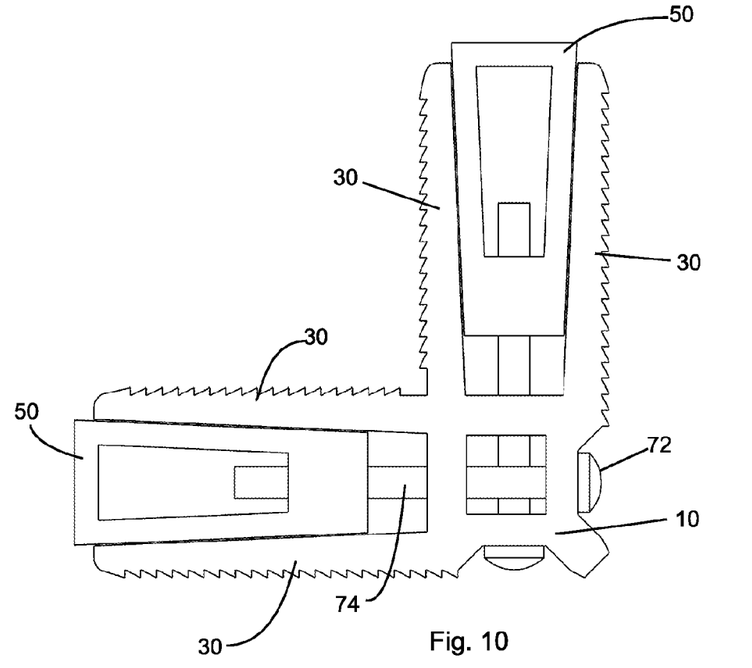
FIG. 10 is a side view of a mitre join support in accordance with a fifth embodiment of the present invention.

The embodiment of FIG. 10 is essentially a reverse of the arrangement of FIG. 9, whereby a single moveable portion 50 is located between two fixed portions 30. It will be appreciated that the resulting wedging action is effectively the same.

Figure 11:
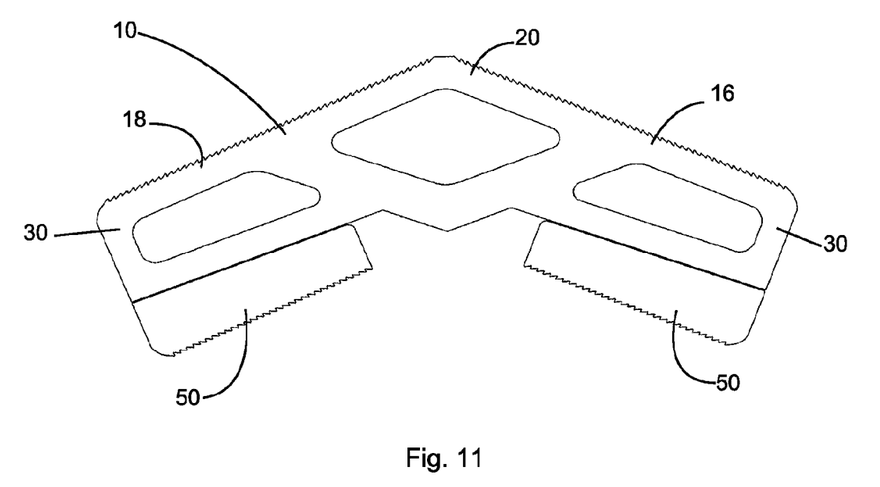
FIG. 11 is a side view of a mitre join support in accordance with a sixth embodiment of the present invention.

The above embodiments have all resulted in mitre joins having a characteristic angle of 90°. It will be apparent to a skilled addressee that the mechanism described can also be used for mitre joins requiring an acute angle, or an obtuse angle. FIG. 11 demonstrates an embodiment of the present invention employing an obtuse angle of about 140°.

Modifications and variations as would be apparent to a skilled addressee are deemed to be within the scope of the present invention.

The self-centering nature of the present invention has been described with reference to the first embodiment disclosed, and is apparent in the other shown embodiments. This self-centering nature allows for a relatively unskilled user to achieve an exact desired characteristic angle, with no significant risk of misalignment. The use of distributed load across bearing surfaces also mitigates against damage to the rails.

It should be noted that the preferred embodiments described above each involve a mitre join support 10 which has a fixed portion 30 of the first arm 16; a central region 20; and a fixed portion 30 of the second arm 18 all formed from a single integral member. It is envisaged that this member may be formed by extrusion, with individual supports 10 cut from a continuous extrusion. As a result, any weakness in the mitred joint is no longer at the corner, but spaced from the corner by the length of the first and second arms 16, 18. This potentially provides for a significantly stronger overall structure.

The invention claimed is:

1. A support for a mitre joint, the support having a central region, the support having a first arm extending away from the central region in a first direction and a second arm extending away from the central region in a second direction, the second direction being angled with respect to the first direction by a given angle;
    each of the first arm and the second arm having:
    (a) a fixed portion oriented generally in the respective first or second direction;
        the fixed portion having an outer surface, and having an inner surface opposed to the outer surface and inclined relative to the respective first or second direction at an inclination angle;
    (b) a moveable portion arranged to move generally in the respective first or second direction, the moveable portion having an outer surface opposed to an inner surface, the inner surface being inclined relative to the outer surface at the inclination angle; and
    (c) an adjustment mechanism arranged to move the moveable portion;
        wherein the inner surface of the moveable portion is arranged to abut the inner surface of the fixed portion, with the outer surface of the moveable portion being generally aligned in the respective first or second direction.

2. A support for a mitre joint as claimed in claim 1, wherein the given angle is 90°.

3. A support for a mitre joint as claimed in claim 1, wherein the given angle is an acute angle.

4. A support for a mitre joint as claimed in claim 1, wherein the given angle is an obtuse angle.

5. A support for a mitre joint as claimed in claim 1, wherein the outer surface of each fixed portion is oriented in the respective first or second direction.

6. A support for a mitre joint as claimed in claim 1, wherein the adjustment mechanism is a linear actuator.

7. A support for a mitre joint as claimed in claim 6, wherein the linear actuator is a lead screw.

8. A support for a mitre joint as claimed in claim 7, whereby the lead screw of the first arm is laterally offset in a transverse direction relative to the lead screw of the second arm.

9. A support for a mitre joint as claimed claim 1, wherein the outer surface of each fixed arm is ridged.

10. A support for a mitre joint as claimed in claim 9, wherein the outer surface of each fixed arm has ridges oriented perpendicular to the respective first or second direction.

11. A support for a mitre joint as claimed in claim 1, wherein the outer surface of each moveable arm is ridged.

12. A support for a mitre joint as claimed in claim 11, wherein the outer surface of each moveable arm has ridges oriented perpendicular to the respective first or second direction.

13. A support for a mitre joint as claimed in claim 1, wherein each fixed arm has a narrow end remote from the central region.

14. A support for a mitre joint as claimed in claim 1, wherein each moveable arm has a wide end oriented away from the central region.

15. A support for a mitre joint as claimed in claim 1, wherein each moveable arm has a narrow end oriented towards the central region, the narrow end including an internally threaded aperture extending in the respective direction inwardly from the narrow end in the respective first or second direction, wherein the internally threaded aperture is arranged to receive the adjustment mechanism.

16. A support for a mitre joint as claimed in claim 1, wherein each of the first and second arms includes two moveable portions.

17. A support for a mitre joint as claimed in claim 16, wherein the outer surface of the fixed portion is inclined relative to the respective first or second direction at a second inclination angle, and a second moveable portion has an inner surface arranged to abut the outer surface of the fixed portion, the inner surface of the second moveable portion being inclined relative to an outer surface of the second moveable portion at a second inclination angle.

18. A support for a mitre joint as claimed in claim 16, wherein each of the first and second arms includes two adjustment mechanisms, one associated with each moveable portion.

19. A support for a mitre joint, the support having a central region, the support having a first arm extending away from the central region in a first direction and a second arm extending away from the central region in a second direction, the second direction being angled with respect to the first direction by a given angle;
    each of the first arm and the second arm having:
    (a) a fixed portion oriented generally in the respective first or second direction;
        the fixed portion having an outer surface, and having an inner surface opposed to the outer surface and inclined relative to the respective first or second direction at an inclination angle;
    (b) a moveable portion arranged to move generally in the respective first or second direction, the moveable portion having an engaging surface, the engaging surface being inclined relative to the respective first or second direction at the inclination angle; and
    (c) an adjustment mechanism arranged to move the moveable portion;
        wherein the inner surface of the moveable portion is arranged to abut the inner surface of the fixed portion.

20. A support for a mitre joint as claimed in claim 19, wherein each of the first arm and the second arm have two fixed portions, with the outer surfaces of each fixed portion being generally parallel, and with the moveable portion being located between the two fixed portions and having two opposed engaging surfaces.

* * * * *